United States Patent [19]

Downen et al.

[11] 4,162,496

[45] Jul. 24, 1979

[54] REACTIVE SHEETS

[75] Inventors: David N. Downen, Tulsa, Okla.; Bert A. Eichenberger, Panorama City, Calif.

[73] Assignee: Rockwell International Corporation, El Segundo, Calif.

[21] Appl. No.: 628,170

[22] Filed: Apr. 3, 1967

[51] Int. Cl.² .............................................. H01Q 17/00
[52] U.S. Cl. .................................................. 343/18 A
[58] Field of Search .......................... 343/18 A, 18 B; 174/35 MS, 35 GC; 252/511, 503

[56] References Cited

U.S. PATENT DOCUMENTS

| 2,877,286 | 3/1959 | Vance et al. | 343/18 X |
|---|---|---|---|
| 3,568,195 | 3/1971 | Wesch | 343/18 |

Primary Examiner—Maynard R. Wilbur
Assistant Examiner—Lawrence Goodwin
Attorney, Agent, or Firm—Charles T. Silberberg

[57] ABSTRACT

A radar attenuator panel incorporating reactive elements is provided comprising a composite of electrically semiconductive or reactive layers separated by relatively non-conductive layers with the entire structure bonded together with compatible thremosetting resins. The electrically reactive attenuator layers have a complex admittance wherein the imaginary portion is substantial compared with the real portion. A sheet having a ratio of the imaginary portion to the real portion of complex admittance in the range of 0.7 to 2.0 throughout the frequency range from S-Band through X-Band is provided by impregnating a glass fabric with a phenolic resin having amorphous carbon and aluminum particles dispersed therein. The carbon is preferably present in the range of 9 to 18 parts by weight and the aluminum is preferably present in the range of 5 to 42 parts by weight per 60 parts by weight of resin.

The reactive layers are separated by a cellular honeycomb relatively low dielectric material that may be free of semi-conductive particles to obtain a controlled space between the reactive sheets. The honeycomb comprises a phenolic resin glass fabric honeycomb core. Phenolic resin impregnated glass faric sheets are employed in the sandwich for high core shear strength and to fix the location of the particles in the attenuator sheets. A phenolic-epoxy resin adhesive is employed adjacent the honeycomb core to assure good bonding thereto.

A carefully controlled gradient of electrical properties in the reactive sheets is provided between the outer surface of the radar attenuator panel and the inner surface thereof. A conductive metal layer is provided on the inner surface of the panel to provide a controlled radar reflectance into the reactive layers. By incorporating at least some reactive sheets in the radar attenuating structure, the criticality of the dielectric constant and thickness of the spacing between the reactive layers is alleviated. Thus changes in thickness of the attenuator and changes in angle of incidence of radar on the structure may be accomodated without requiring large design changes.

25 Claims, 2 Drawing Figures

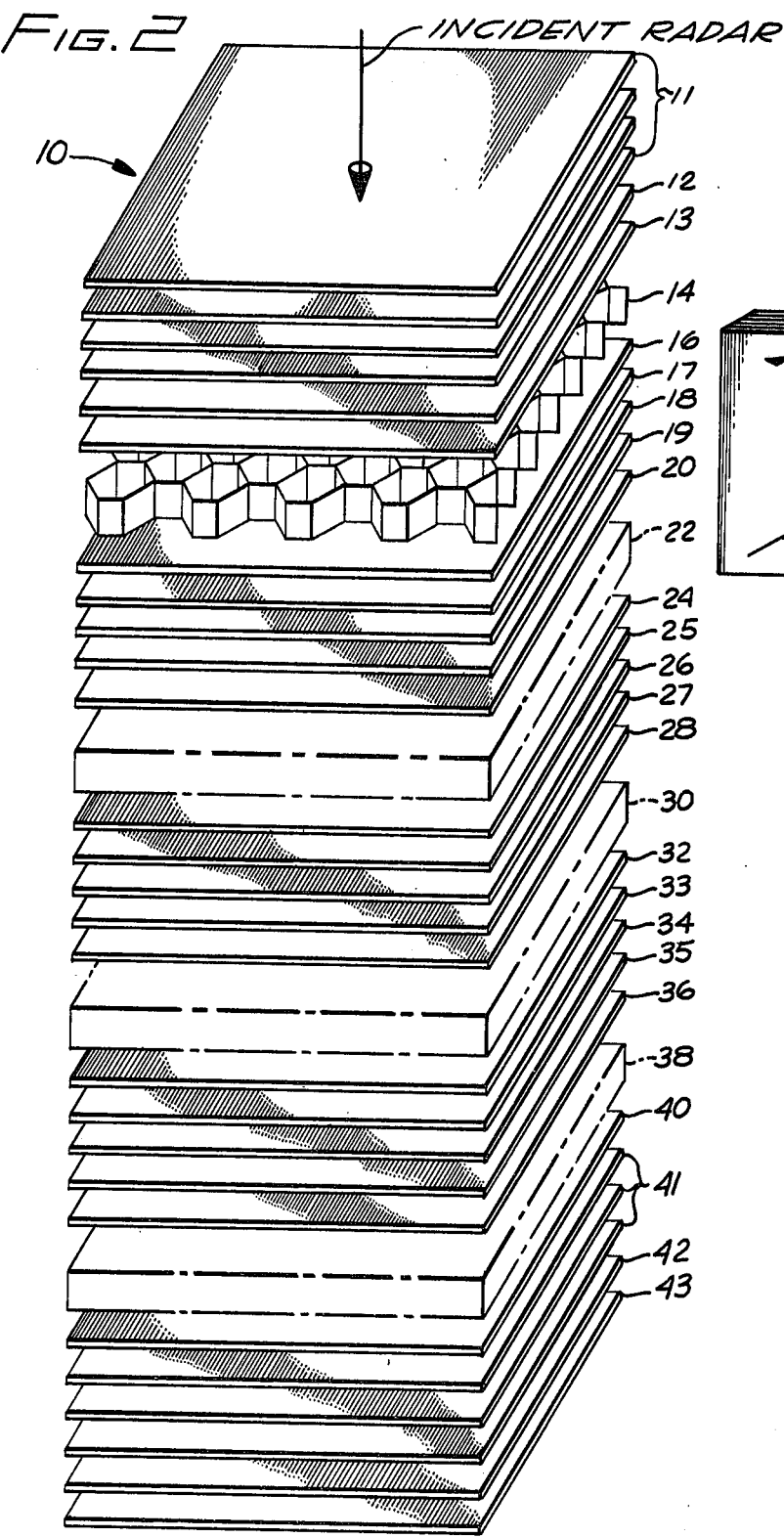
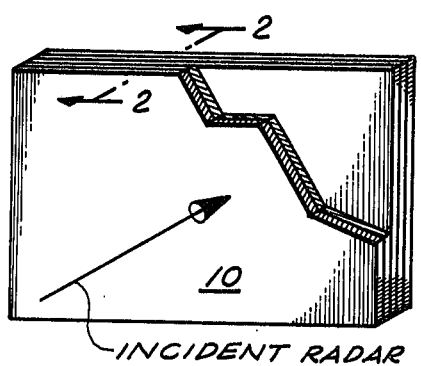

REACTIVE SHEETS

BACKGROUND

Current radar attenuation materials may be classified conveniently into interference type and graded dielectric systems. Graded constant attenuators depend on the lossiness of the material of construction to attenuate any radar energy impinging thereon. A material with a low dielectric constant or relative permittivity, approximately the impedance of free space, is usually placed at the surface upon which radar impinges in order to minimize reflection of the incident radar. The dielectric constant and lossiness of other layers more remote from the surface are gradually increased to reduce the overall weight and thickness of the attenuator.

Interference type attenuators on the other hand reduce radar reflection by destructive interference. An example of this type of attenuator is the Salisbury screen wherein a thin layer of controlled electrical conductivity (often known as space cloth) is spaced from a reflective surface at a distance equal to one quarter of the wave length of the radar to be attenuated. A plurality of attenuator layers or sheets of controlled electrical properties can be spaced successively from a reflective surface to provide attenuation over a broad range of frequencies.

In the prior art the electrical properties of the attenuator sheet material have been adjusted by addition of carbon or similar semi-conductive materials in order to obtain a substantial resistivity in the sheets. Similarly, widely dispersed metal particles have been incorporated in sheet material in order to obtain some conductance therein with high resistivity. The sheet materials so produced have provided a layer with a substantial resistance which has been found useful in radar attenuators. It has been found in interference attenuators when employing sheets with resistance alone that either the spacing between the sheets must be large, thereby leading to thick and unnecessarily heavy structures, or the dielectric constant of the material spacing the resistive sheets apart must be modified, which leads to substantial manufacturing problems.

In the past interference type attenuators have incorporated honeycomb panel to separate a resistive layer from a reflective surface in order to hold the resistive layer at one quarter wavelength from the surface. In order to provide ease of manufacture of the attenuators a complex combination of thermoplastic and thermosetting resins has been employed. In addition it has been found desirable to modify the electrical properties of the honeycomb core spacers for minimizing the total thickness of the attenuator panels, which leads to heavy panels and complexity of fabrication.

BRIEF SUMMARY OF THE INVENTION

According to a preferred embodiment of the invention there is provided a radar attenuator structure of the interference type formed of sheets having both resistance and reactance and low density low dielectric spacer layers between the sheets, all bonded together with compatible resins. The structure preferably employs glass fabric and phenolic thermosetting resins. The attenuator layers of the interference attenuator comprise glass fabric coated or impregnated with a conventional phenolic resin. Dispersed in the phenolic resin is finely divided amorphous carbon in the range of from 9 to 18 parts by weight per 60 parts of resin. Additionally dispersed in the phenolic resin are finely divided particles of aluminum in the range of from 5 to 42 parts by weight per 60 parts by weight of resin. A coating thickness of from 0.01 to 0.10 grams of resin, aluminum, and carbon per square inch of fabric gives a sheet material having an admittance wherein the ratio of the imaginary portion to the real portion of the admittance is in the range of from 0.7 to about 2.0 throughout the range from S-Band through X-Band. Thus, the reactance of the sheets is quite substantial relative to the resistance thereof. In conventional sheets it is found that the imaginary portion of admittance becomes appreciably lower with increasing frequency. By combining highly conductive aluminum powder with semi-conductive amorphous carbon powder in a resin coating, the ratio of imaginary portion of admittance to the real portion remains high with increasing frequency and when relatively high proportions of aluminum are employed the ratio may even increase with increasing frequency.

Honeycomb dielectric layers are provided between the attenuator layers and each comprises a glass fabric impregnated with a phenol-formaldehyde resin. Glass fabric prepregs, comprise glass fabric sheets previously impregnated with a phenol-formaldehyde resin, are provided between each of the attenuator sheets and the adjacent honeycomb cores so that the structure is composed of thermosetting resins for resistance to elevated temperature.

In one embodiment it is preferred to provide a layer of honeycomb and a structural layer of glass fabric sheets outwardly of the first attenuator sheet, and thermosetting resin adhesives may be provided in the structure for bonding to the honeycomb.

It is therefore a broad object of this invention to provide an improved interference type radar attenuator.

Other objects and many of the attendant advantages of this invention will be readily appreciated as the same becomes better understood by reference to following detailed description when considered in connection with the accompanying drawings wherein:

FIG. 1 illustrates a typical radar attenuator panel constructed according to the principles of this invention; and FIG. 2 illustrates an exploded view of the radar attenuator panel illustrated in FIG. 1.

Throughout the drawings like numerals refer to like parts.

DETAILED DESCRIPTION

As radar or other electromagnetic wave energy impinges on a structure, the amount of energy reflected from the surface is dependent on the degree of mismatch between the impedance of the structure and the characteristic impedance of air or free space. For these purposes free space can be considered as a wave guide of infinite dimensions which has a characteristic impedance of 377 ohms. Thus it is found that a material having a very low impedance, such as a metal, has a large mismatch; its impedance being considerably below the impedance of free space. A large radar reflection is obtained from such material. Likewise a material having an impedance very nearly that of free space reflects an extremely small amount of radar energy.

Vehicles employed for penetrating a defender's radar system are either constructed of metal or have internal components of metal that will reflect a substantial quantity of radar energy. Because of this it is impossible to make the vehicles completely transparent to radar and, as an alternative, attenuation of the radar by the vehicle is preferred. In order to reduce reflections from a surface, a match between the impedance of the surface and free space is desirable. In the attenuating structure described in the illustrative embodiment the impedance of the structure to an incident radar beam is very similar to the impedance of free space. The impedance as seen by the radar beam is the result of the impedances of all of the resistive structure outside the metal just as in a transmission line where the impedance is determined by all elements. The impedance of the surface or at any point within the structure is obtained by consideration of the impedance of all of the components inwardly of that surface or point.

In a preferred embodiment of an interference type attenuating structure multiple layers of partly conductive, partly reactive material are employed to provide a gradual series of stepwise changes in the impedance or its reciprocal, admittance, between that of free space and that of a metallic internal layer. By providing a gradual transition of admittance, only a low amount of reflection is obtained at any of the individual layers since each is only slightly different from the admittance of the overlying material. The admittance of each of the conductive layers is therefore chosen so as to provide a smooth transition in admittance. In a preferred embodiment both the real and imaginary portions of admittance are considered and both are selected so as to give optimum attenuation and minimum reflection over a broad frequency range.

As previously mentioned, a radar beam impinging on a metal surface is reflected therefrom in the same general way that reflection to form a standing wave occurs in a metal terminated wave guide. If a sheet of material having a resistivity of 377 ohms per square is placed at one-quarter wavelength spacing from the metal termination, the standing wave set up has a maximum electric field at the resistive material and the energy in the wave is attenuated by conduction in the resistive material.

Such an arrangement is termed a Salisbury screen or quarter wave screen. A resistivity of 377 ohms per square is employed to match the impedance of free space so that no reflection is obtained from the resistive material. As viewed along the wave guide, this type of termination appears like an infinitely long guide since no standing wave is reflected. This occurs for a specific wavelength and reflections occur at other wavelengths with magnitudes determined by their relation to the wavelength for which the screen is tuned. The wavelength of importance is the wavelength in the material between the resistive material and the metal termination and this is dependent on the dielectric constant of the material therebetween.

In order to provide a good attenuating structure capable of attenuating radar beams of different frequency, it is desirable to have high attenuation throughout a range of from about $2 \times 10^9$ to $10 \times 10^9$ cycles per second, for example. This corresponds to a wavelength range of from about 15 to about 3 centimeters. In order to obtain a broad band of attenuation it would appear desirable to have a multiplicity of quarter wave screens, however, there is an interaction between screens when more than one is employed and it is also necessary to limit the number due to weight considerations. A limited number of attenuator sheets or screens must be used in any practical structure and attenuation optimized by varying the electrical properties of the individual sheets. In a broad band structure for attenuating waves in the frequency range of from 2 to $10 \times 10^9$ cps., a total thickness of composite of somewhat less than one inch has been employed to give approximately quarter wave attenuation for the longer waves. The space between individual sheets or screens is in turn selected to provide approximately quarter wave attenuation for the shorter waves. Thus it is desirable to construct a composite material having a series of impedance layers spaced apart by a dielectric material.

Such a composite material of appropriate electrical characteristics and physical strength may be advantageously incorporated into selected parts of an aircraft, for example, to minimize radar reflectivity of the aircraft. A typical panel 10 of radar attenuation material such as illustrated in FIG. 1, partly cutaway to show the laminar nature thereof, may be attached parasitically to an aircraft or other vehicle in order to attenuate radar directed thereat or may be placed in front of an object to shield it from radar. Likewise a panel such as illustrated in FIG. 1 can be employed as a structural element of an aircraft or other vehicle in lieu of metal structures. In the practice of this invention there is provided a light weight, high strength radar attenuator operable at reasonably elevated temperatures such as may be encountered in modern high speed aircraft. Such a radar attenuator panel has sufficient structural strength to be employed directly in the primary structure of an aircraft in many of the locations thereon known to be highly reflective of radar. By employing a simple combination of thermosetting resins, an attenuator resistant to elevated temperature exposure and having structural strength is provided.

An exploded view of the radar attenuator panel of FIG. 1 is presented in FIG. 2 in order to better illustrate the assembly of the structure. Broadly this panel comprises a plurality of fabric sheets and a number of layers of low density, low dielectric constant material bonded together to form a composite structural material. The outer surface of the radar attenuating panel is illustrated near the top of FIG. 2 and is the surface of the panel upon which incident radar energy impinges. In a preferred embodiment a first sheet 11 of material upon which the radar impinges is a glass fabric impregnated with a conventional phenol-formaldehyde resin. In a typical embodiment this fabric is a style 181 glass fabric which is a 7/1 satin weave with $57 \times 54$ ends/inch. The thickness of the fabric is about 0.0085 inch weighing about 8.9 oz./yd$^2$ before coating. The phenolic resin impregnated on the first sheet 11 is partially cured to a very early B-stage so that the sheet is not excessively tacky; however, a substantial number of cross linking bonds remain available for further polymerization of the resin. Phenolic resin impregnated sheets suitable for use in this invention are commercially available from many sources and are known to those skilled in the art as "prepregs" signifying that the glass fabric sheets have been previously impregnated with a resin.

Inwardly of the first sheet 11 of the radar attenuator panel there are provided three more layers of glass fabric prepregs 11 all of which in the final assembly are self-bonded together. The three additional fabric sheets 11 are preferably substantially identical to the first fabric sheet 11 in both the fabric and the resin impregnated therein. Inwardly of the three outer sheets is a glass fabric prepreg 12 comprising style 112 glass fabric impregnated with a phenol-formaldehyde resin substantially the same as the resin on the prepregs 11. The style 112 glass fabric has a thickness of about 0.003 inch and a thread count of approximately 40×39 in a plain or box weave. The outer layer of prepregs thus provides a substantial structural element for the radar attenuator. It will be apparent that the outer surface can be lightly sanded or painted with thermosetting materials for increased smoothness or to enhance the appearance of the structure.

Next inwardly from the surface upon which radar impinges is a thin layer of adhesive 13 followed by a relatively thicker layer of honeycomb core 14. The adhesive serves as a bonding material between the glass fabric, resin prepreg 12 and the honeycomb core 14 and provides for proper filleting at the juncture between the honeycomb cell walls and the prepregs. Although illustrated as a smooth layer, it will be apparent that the adhesive is a smooth layer only before bonding and conforms more closely to the honeycomb shape after bonding because of wetting of both the prepregs and the honeycomb.

A preferred adhesive material comprises a thermosetting epoxy-phenolic co-polymer. The epoxy resin is preferably present as about ⅔ of the mixture and the phenolic resin comprises about ⅓ with a small proportion of activator added. A typical epoxy resin for use in the adhesive is one having a viscosity of from 10,000 to 16,000 cps and an epoxide equivalent of approximately 180 to 195 such as is commercially available as Epon 828 from the Shell Chemical Company. The phenolic resin preferably comprises a conventional phenol-formaldehyde resin or may comprise any of a number of conventional substituted phenolic resins as will be apparent to one skilled in the art. It is also desirable in order to obtain a rapid cure of the adhesive resin to employ an activator such as diethylene-normal-propylene, a polyamide-polyamine, or the like. A typical accelerator is dicyandiamide in the proportion eight parts per hundred parts by weight of resin. Many variations of the thermosetting resins will be apparent to one skilled in the art. Such a resin system is conveniently handled in a solvent comprising methyl-ethyl-ketone and toluene and is preferably deposited on a very open weave glass cloth scrim to give a weight of about 0.08 pounds per square foot after drying. A suitable scrim fabric which merely holds the solid adhesive during panel fabrication comprises Exeter Mills Number 10 which is essentially a glass fabric "cheese cloth" with 1/16 inch squares. Upon heating during the curing cycle described hereinafter the solid adhesive 13 melts and wets the phenolic prepreg 12 and the honeycomb 14 before polymerizing. This serves as a filleting and bonding agent to give the panel high core shear.

Inwardly from the outer layer of prepregs and the adhesive layer 13 is a honeycomb core material 14. The honeycomb employed in the practice of this invention is arranged to have the axis of the honeycomb cells oriented normal to the surface of the sheets in order to space the fabric layers apart as illustrated in FIG. 2. In a preferred embodiment the honeycomb material is a glass fabric having a relatively coarse thread count such as, for example, 30 to 35 in an essentially uniform weave, impregnated with a conventional phenol-formaldehyde resin which has been cured to an advanced B-stage as provided by conventional commercial practice. In a B-stage cured resin system the material is substantially completely polymerized so that very few cross-linking bonds are available for further polymerization. Because of the relatively small amount of unpolymerized material in the honeycomb core it is desirable to employ an interface adhesive 13 as set forth hereinabove. A typical honeycomb material for use in the illustrative embodiment has a hexagonal cell cross section with a nominal cell dimension of about 3/16 inch and a total thickness of about 0.2 inch or slightly less. Such material has a density of about 4.0 pounds per cubic foot and a dielectric constant of about 1.1 to 1.2 when viewed at radar frequency along a direction parallel to the axes of the individual cells.

Thus it is a feature of the radar attenuating structure that a structural layer is provided at the surface and spaced apart from the first attenuating layer described hereinafter. The outer structural layer provides strength to the structure and protection for the underlying layers so that surface damage does not seriously affect the electrical properties of the structure. Further the outer layer provides a means for varying the thickness of the radar attenuating structure without requiring extensive changes in the electrical characteristics of the components. By combining reactive sheets in the radar attenuator structure as hereinafter described, and incorporating an outer structural layer which is relatively inert electrically, substantial differences in thickness and structural strength can be tolerated without noticeably degrading the radar attenuation. Thus similar electrical performance is obtained from panels 5/8 inch thick and 7/8 inch thick over most of the frequency range employing the same components even though the structural properties are quite different. The 7/8 inch thick panel has higher absorptivity at low frequencies because of better match with the longer wavelengths and is preferred where low frequency threat radar may be encountered.

Next inwardly from the honeycomb layer 14 is another layer of adhesive epoxy-phenolic resin 16 substantially identical to the adhesive layer 13 described hereinabove. The adhesive layer 16 preferably has a thickness to give a weight of about 0.055 pounds per square foot of adhesive on the scrim.

Next inwardly from the adhesive film 16 is a phenolic resin, glass fabric prepreg 17. The prepreg 17 is substantially the same as the aforementioned prepreg 12 in that the glass fabric is preferably style 112. The phenol-formaldehyde resin impregnated in the prepreg 17 is substantially the same as the afore-mentioned phenolic resins.

Next inwardly from the prepreg 17 is an attenuator sheet 18 which preferably comprises a glass fabric impregnated with a phenolic resin having both carbon and aluminum powders dispersed therein. The dispersion of carbon and aluminum powders in the phenolic resin gives the attenuator sheet an impedance appreciably different from the impedance of free space. By combining aluminum powder with carbon powder in the attenuator sheet the imaginary portion of the admittance of the sheet has a substantial value relative to the real portion of admittance. Such a reactive sheet in a radar attenuator structure reduces the requirement for a substantial dielectric constant in the material spacing the attenuator sheets apart and minimizes the dependence of panel reflectance on the nature of the honeycomb core materials employed for spacers. Thus, in the prior art honeycomb cores were coated with resins bearing carbon particles in order to increase the dielectric constant. By employing reactive sheets in an attenuator structure the necessity of the honeycomb core dip has been obviated. The honeycomb core dip not only increased the cost and complexity of manufacturing, but also increased the weight of the honeycomb core from about 4 pounds per cubic foot to about 9 or 10 pounds per cubic foot. It is apparent that a density decrease from 9 to 4 pounds per cubic foot is of substantial value in a radar attenuator material, particularly if it is to be used in an airborne application. The elimination of a core dip for modifying the dielectric constant of the honeycomb core is a direct consequence of employing reactive sheets in an interferenc type attenuator.

Reactive sheets such as the attenuator sheet 18 are readily provided in the practice of this invention according to a preferred embodiment. A base fabric is preferably employed as a carrier for a resin having conductive and semi-conductive particles dispersed therein so that the sheets have strength for handling during fabrication and the location of the particles is fixed and well known. It is found that in many applications a glass fabric is preferred since the continuous filament glass provides a high structural strength and the material is useable at elevated temperatures without any reaction with air or any of the resin systems employed. A suitable glass fabric is, for example, style 116 which comprises a plain or box weave about 0.004 inch thick and weighing about 3.16 ounces per square yard. Such a fabric is made with 450 yarn and has $60 \times 58$ ends per inch. Such a fabric can be used in the greige condition or can preferably incorporate a surface treatment for better adhesion for coating materials. A typical surface finish is known in the art as A-1100, which comprises a silance such as an amino-silane applied to the surface and dried. Another suitable surface finish is Volan A from E. I. duPont deNemours & Co., Wilmington, Del. which comprises a Werner type methacrylato chromic chloride complex treatment. Such a surface treatment minimizes water adsorption in the glass fabric and enhances adhesion between the glass and phenolic resins and the like.

The greige or surface treated fabric is coated or impregnated with a resin having both carbon and aluminum powders dispersed therein. A preferred resin comprises a conventional phenol-formaldehyde resin applied to the fabric in a solvent solution. Preferred solvents comprise methyl ethyl ketone, methyl isobutyl ketone, or methyl ethyl ketone plus toluene. A suitable phenolic resin comprises, for example, Resinox SC-1008 available from Monsanto Chemical Company, St. Louis, Mo. Many other phenolic resins and the like will be apparent to one skilled in the art. The preferred material comprises a phenol-formaldehyde resin in the proportion of about 60% solids in a solvent comprising principally methyl ethyl ketone to give a viscosity of 200-300cps. Such a resin solution may be diluted with methyl ethyl ketone or methyl isobutyl ketone to a solution having about 10% solids by weight. Such a solution gives good dispersion of powders as described hereinafter and provides for ready coating of fabrics by brushing or spraying. In preparing resins for coating on fabrics by other techniques such as dip and doctor coating or calendering, other proportions of solvent can readily be employed, varying from about 75 to 200 parts by weight of solvent per 60 parts of resin solids, as will be apparent to one skilled in the fabric coating art.

In order to provide the desired electrical properties in the resultant sheet, carbon and aluminum powders are dispersed in the resin solution before coating on the fabrics. A preferred carbon is an amorphous powder such as acetylene black, channel black, furnace black, and the like that is prepared from decomposition of a hydro-carbon. Such as amorphous carbon powder has relatively high inherent resistivity which gives a suitable range of resistance to the coated sheets with a reasonable quantity of solids mixed with the resin. A suitable carbon is, for example, XC-72R available from Cobot Carbon Co.

A suitable metal powder comprises a conventional litho aluminum powder such as is available from Reynolds Aluminum Company under the designation 4-591 Litho powder. Such a material is low flakiness aluminum powder with high inherent conductivity such as used in printed circuit boards and is readily dispersed in the resin solution for coating on the fabric to produce a substantial reactance in the sheets. The average particle size is in the order of 40 microinches as indicated by 11% retention on a number 325 screen (44 microinch). It is preferred in mixing the carbon and aluminum in the resin solution, to first wet the dry powders with a portion of solvent by hand or with a mechanical mixer. After preliminary wetting of the dry powders they are readily dispersed in the resin solution with a conventional paint shaker or, for larger batches, in a high speed blender, or other mixing processes imparting high shear to the mixture.

After the resin solution having both carbon and aluminum powders dispersed therein has been prepared, the glass fabric is coated or impregnated with the solution and suspension by any of a number of conventional coating processes. Thus, the required number of coats of solution can be box brushed on the fabric until a desired solids pick up is obtained thereon. Similarly dip coating can impregnate the fabric with the solution and suspension, or in thicker coatings a doctor blade application can be employed. After coating the fabric the solvent for the resin is evaporated at room temperature or slightly elevated temperature and the fabric is preferably B-Stage cured by heating to about 220° F. for 10 minutes. A phenolic resin system such as is described is substantially completely cured if desired by heating for 1 hour at 350° F.

It is desirable in fabricating many radar attenuator structures to employ sheets having a substantial imaginary portion of admittance relative to the real portion thereof. It is preferred that the ratio of imaginary portion to real portion of the admittance be in the range of 0.7 to 2.0. In order to obtain such a ratio it is preferred that the proportion of carbon powder be in the range of from 9 to 18 parts by weight per 60 parts resin and the proportion of aluminum powder be in the range of from 5 to 42 parts by weight per 60 parts of resin. It is also preferred that the coating be present on the fabric after the solvent has evaporated in the range of from 0.01 to 0.10 grams of coating per square inch of fabric. It is found with these values that the admittance is maintained in the range of from about $0.001 + j\ 0.001$ mho to about $0.10 + j\ 0.10$ mho and the ratio of imaginary to real portions of admittance is in the range of from 0.7 to 2.0. It is also preferred that the ratio of aluminum to carbon be in the range of from about 0.5 to about 2.5 parts by weight of aluminum powder per part of carbon powder in order to give a ratio of imaginary and real portions in the above identified range.

When the coating thickness is less than about 0.01 grams per square inch, the coating is so thin that minor processing variations may have a major effect on electrical properties and reliability of the coating is therefore substantially poorer than in coatings greater than about 0.01 grams per square inch. When the weight pick up of coating is greater than about 0.10 grams per square inch, the fabrics tend to be stiff and cumbersome after coating and difficult to fabricate in acceptable radar attenuator structures.

The ratio of imaginary and real portions of admittance is preferably in excess of about 0.7 since lower ratios give relatively low attenuation in completed radar attenuator materials and the benefit to be gained thereby does not warrant the processing complexity. When the ratio of the imaginary portion of the admittance to the real portion of the admittance is greater than about 2.0, substantial differences in the electrical properties of the sheets are noted at different frequency ranges. In order to prepare a broad frequency band radar attenuator it is desirable to minimize differences in electrical properties as a function of frequency.

It is preferred in a fabric having substantial reactance that the real portion of the admittance be in the range of from 0.001 to 0.010 mho. Similarly it is preferred that the imaginary portion of the admittance be in the range of from 0.001 to 0.010 mho. When either the real or imaginary portions of the admittance is lower than about 0.001 mho the sheets are substantially ineffective in a radar attenuator since a very small absorption is obtained therein. It is also preferred that both the real and imaginary portions of the admittance be less than 0.010 mho in order for a radar attenuator constructed therewith to be useful over a broad frequency band. It is found that with both real and imaginary portions of the admittance in the range of 0.001 to 0.010 mho the admittance values are relatively insensitive to changes in the frequency range of the radar and good attenuation is obtainable for radar signals of widely different frequencies.

In order to obtain a real portion of admittance in the range of from about 0.001 to 0.010 mho it is preferred that the quantity of carbon in the resin be in the range of from 9 to 18 parts by weight of carbon per 60 parts of resin. A smaller concentration of carbon is substantially ineffective in raising the real portion of the admittance to a useful value even with addition of metal powder. When the quantity of carbon in the resin is higher than about 18 parts and substantial amounts of aluminum are included, as hereinafter described, it is found that the coating suspensions are difficult to handle in fabrication and reliability of the coated fabric is substantially more difficult to obtain.

Similarly in order to obtain an imaginary portion of the admittance which is substantial relative to the real portion it is preferred that aluminum powder be incorporated in the coating material in the range of from 5 to 42 parts by weight of aluminum powder per 60 parts by weight of resin. It is found that with less than about 5 parts by weight of aluminum the imaginary portion of the admittance is too low for effective attenuation of radar in most structures. When the quantity of aluminum powder is greater than about 42 parts by weight per 60 parts of resin, particularly in combination with high proportions of carbon, the coating solutions and suspensions are difficult to handle and the composition of resin mixture coated on the fabric may vary during processing.

In the practice of this invention fabric sheets were coated according to the above described process with various compositions and a hand drawing coating technique. These reactive sheets were subjected to wave guide determinations of the complex admittance at radar frequencies in S-, C-, and X-Bands; 3.0, 5.4 and 9.375 GHz respectively. Table I sets forth the composition of materials applied to a style 116 glass fabric along with the weight pick up of cured phenolic resin, carbon, and aluminum per square inch of fabric. This treatment resulted in a complex admittance as set forth in Table I and a ratio of the imaginary to real portions of the admittance in the range of from 0.7 to 2.0 throughout the frequency band from S- to X-Bands.

Similarly it will be apparent to one skilled in the art that in lieu of a single attenuator sheet that two sheets can be employed to obtain a high reactance. Thus a single layer having carbon particles dispersed therein can be employed to provide a resistive layer. A second layer can be employed adjacent the resistive layer to provide a capacitive or inductive reactance.

TABLE I
ADMITTANCE OF ATTENUATOR SHEETS

| Composition (parts by weight per 60 parts resin) | | Weight Pickup (grams/inch$^2$) | Complex Admittance (mhos) | | | Ratio of Admittance (imaginary/real) | | |
|---|---|---|---|---|---|---|---|---|
| Carbon | Aluminum | | S-Band | C-Band | X-Band | S Band | C Band | X Band |
| 9 | 5 | 0.02 | .00153 + j .00112 | .00180 + j .00139 | .00215 + j .00179 | 0.73 | 0.77 | 0.83 |
| 9 | 5 | 0.10 | .00338 + j .00332 | .00576 + j .00521 | .00757 + j .00588 | 0.98 | 0.91 | 0.78 |
| 9 | 15 | 0.02 | .000889 + j.000932 | .0001069 + j .00129 | .00153 + j .00192 | 1.05 | 1.21 | 1.25 |
| 9 | 15 | 0.04 | .001724 + j .00222 | .00271 + j .00376 | .00327 + j .00448 | 1.29 | 1.39 | 1.37 |
| 9 | 15 | 0.08 | .00543 + j .00759 | .00651 + j .00138 | .00881 + j .01377 | 1.40 | 1.74 | 1.56 |
| 12 | 20 | 0.06 | .00163 + j .00224 | .00235 + j .00377 | .00353 + j .00492 | 1.37 | 1.60 | 1.40 |
| 18 | 10 | 0.08 | .00600 + j .00656 | .00804 + j .00919 | .01966 + j .01292 | 1.10 | 1.14 | 0.67 |
| 18 | 30 | 0.02 | .00190 + j .00215 | .00265 + j .0031 | .00420 + j .00510 | 1.13 | 1.17 | 1.22 |
| 18 | 30 | 0.06 | .00354 + j .00513 | .00530 + j .00908 | .00718 + j .01125 | 1.45 | 1.71 | 1.57 |
| 18 | 42 | 0.04 | .00369 + j .00619 | .00765 + j .01051 | .0072 + j .01400 | 1.68 | 1.38 | 1.94 |

Since the two combined layers are thin relative to the wavelength of radar, they appear as a single layer and cause attenuation in substantially the same manner as the carbon and aluminum loaded sheet 18 preferred in the practice of this invention. It will also be apparent that other types of attenuator sheets can be employed in practicing the principles of this invention as desired by one skilled in the art.

It is particularly preferred that the attenuator sheet 18 comprise a glass fabric coated with a conventional phenol-formaldehyde resin in which both carbon and aluminum have been suspended in the proportions of 9 and 15 parts by weight of carbon and aluminum respectively per 60 parts by weight of resin. A total weight pick up of resin, carbon, and aluminum of about 0.01 grams per square foot is preferred in order to give a ratio of imaginary to real portions of admittance in the order of 1.0 throughout the frequency range from L- through X-Bands.

Next inwardly from the attenuator sheet 18 is a prepreg 19 substantially identical to the prepreg 17 hereinabove described. In order to augment core shear strength, the prepregs 17 and 19 may be stitched together with the attenuator sheet 18 with glass threads. Such an expensive operation has not been found necessary in most applications. An adhesive layer 20 substantially identical to the adhesive layer 16 is provided between the prepreg 19 and a honeycomb core 22. The honeycomb core 22 is preferably a 3/16 hexagon of glass fabric-phenolic resin honeycomb about 0.2 inch thick which is substantially identical to the honeycomb core 14.

Next inwardly from the honeycomb core 22 is a sandwich or laminated assembly comprising a layer of adhesive 24, a prepreg 25, an attentuator sheet 26, a prepreg 27 and a layer of adhesive 28. The adhesive layers 24 and 28 are substantially identical to the adhesive layer 16 hereinabove described. The prepregs 25 and 27 are substantially identical to the prepreg 17 hereinabove described. The attenuator sheet 26 is substantially identical to the attenuator sheet 18 except that the weight pick up of 60 parts phenolic resin, 9 parts carbon, and 15 parts aluminum on the glass fabric is in the order of 0.015 grams per square inch. This gives an admittance to the attenuator sheet 26 wherein the ratio of imaginary to real portions of the admittance ranges from about 1.05 in S-Band to about 1.25 in X-band. It will be apparent that other reactive sheets such as described hereinabove can also be employed in the practice of this invention.

Next inwardly from the adhesive layer 28 is a honeycomb core 30 substantially identical to the honeycomb cores 14 and 22 hereinabove described.

Next inwardly from the honeycomb core 30 is a laminated assembly comprising a layer of adhesive 32, a prepreg 33, an attenuator sheet 34, a prepreg 35 and a layer of adhesive 36. The layers of adhesive 32 and 36 are substantially identical to the adhesive layer 16 hereinabove described. The prepregs 33 and 35 are preferably substantially identical to the prepreg 17 hereinabove described. The attenuator sheet 34 preferably comprises a style 116 glass fabric coated with a conventional phenolic resin having amorphous carbon powder dispersed therein. The carbon powder is preferably acetylene black, furnace black or channel black as described hereinabove. It is preferred that the carbon be present as approximately 15 parts by weight of carbon per 60 parts by weight of phenolic resin. Such a composition in a weight pick up of about 0.06 grams per sqaure inch of fabric gives an admittance value at 3 GHz of about $0.0069+j\ 0.0037$ mho. Similarly the admittance at 5.4 GHz is $0.0079+j\ 0.0037$ mho and at 9.375 GHz the admittance is about $0.0088+j\ 0.0021$ mho.

Next inwardly from the adhesive layer 36 is a honeycomb core layer 38 substantially identical to the honeycomb core layers 14, 22 and 30 hereinabove described. An adhesive film layer 40 is next inwardly from the honeycomb layer 38 and bonds the honeycomb to the first of three prepregs 41 substantially identical to the outer prepreg sheets 11 hereinabove described. The adhesive layer 40 is substantially identical to the adhesive 13 and has a weight of 0.08 pounds per square foot. Next inwardly from the innermost of the three prepregs 41 is a metal layer 42 which preferably comprises aluminum foil about 0.002 inch thick. If desired the foil can be primed for better adhesion with a dilute solution of the above described adhesive in methyl-ethyl-ketone. The aluminum foil serves as an electrical termination of the radar attenuator material and reflects radar signals impinging on the structure for attenuation by interference at the overlying attenuator sheets. Inwardly from the aluminum foil layer 42 there is preferably provided an additional prepreg 43 substantially similar to the prepreg layer 12 hereinabove described. The innermost prepreg 43 provides mechanical protection to the soft aluminum foil and permits light sanding or adhesive bonding to the assembly without damage to the aluminum foil. A structure assembled as hereinabove described has a total thickness of about ⅞ inch and provides good radar attenuation throughout L-, S-, C-, and X-Bands. The weight of such a panel is less than 1½ pounds per square foot.

It can be seen that the entire assembly of the radar attenuator has thermosetting resins which are completely compatible at room and elevated temperature. Continuous operation at 300° F. or higher is readily obtained. The structure basically comprises phenolic resin throughout. Phenolic resin is employed for dispersing conductive and semi-conductive material in the attenuator sheets. The attenuator sheets are preferably partially cured before assembly and therefore the particles are not subject to migration upon subsequent curing. Previously barrier layers have been employed adjacent attenuator sheets to prevent migration of carbon therefrom. By making the radar attenuator material with phenolic resin attenuator sheets with adjacent phenolic resin prepregs, the problem of carbon migration has been obviated without complex additional layers or treatments.

In assembling a radar attenuator panel of the type hereinabove described, a mold is employed and the various prepregs and honeycomb cores are laid up on the mold according to conventional fabrication techniques. FIG. 1 illustrates a flat panel of radar attenuator material; however, it will be appreciated that curved panels can also be provided in the practice of the principles of this invention. The mold line can either be congruent with the exterior of the panel, in which case the outer most prepreg 11 would be laid up first, or can correspond to the inner shape of the part in which case the innermost prepreg 43 would be laid up first.

In either case the prepreg sheets are draped over the mold, cut if necessary, and smoothed in place with the aid of heat guns and similar aids as are well known to one skilled in the art. The attenuator sheets, and thin films of adhesive are handled in substantially the same manner as the prepregs, draping them over the shaped mold as required. Care must be taken in applying the attenuator sheets, to cut and fit in the case of a complex curvature in the mold in order to prevent overlaps or gaps in the attenuator sheet. Either an overlap or a gap of greater than one-fourth of the wave length of radar to be attenuated causes a discontinuity in electrical properties which will cause a substantial reflectance of radar incident thereon. Honeycomb core layers are laid onto the assembled prepregs on the mold in a conventional manner by cutting and fitting as required and forming with the aid of heat guns and the like.

If desired the assembly can be vacuum bagged and partially cured according to conventional practice at intermediate stages of the lay up procedure rather than waiting until the entire assembly is laid up. Partial curing during assembly, particularly after each honeycomb layer is laid up, is desirable so that the honeycomb bond can be inspected and any necessary repairs made before additional bonding. If it is desired, however, the entire assembly can be laid up, vacuum bagged and cured in a single operation. It will also be apparent that an autoclave can be employed for augmenting the pressure applied in the vacuum bagging operation. It is preferred in curing an assembly to heat it for a sufficient time that the center of the laminated assembly is maintained at about 350° F. for at least an hour to effect a complete cure of the phenolic resin throughout the structure. The vacuum bag technique involves placing a sheet or film of flexible material over the entire surface and sealing the edges with a paste like material such as zinc chromate putty. Evacuation of the sealed off volume containing the resin impregnated structure causes atmospheric pressure, or higher if curing is in an autoclave, to bear through the flexible sheet and compress the assembly against the mold surface. Heating can then proceed directly to the curing temperature, or in several stages to effect solvent removal and partial curing at less than the maximum temperature as will be apparent to one skilled in the art.

A distinct advantage of employing reactive sheets for at least a part of the attenuator sheets in a radar attenuator material is apparent from the variations which can be made in the overall thickness of the structure or in the angle of incidence of radar impinging thereon without a substantial effect upon the radar attenuation. Thus, for example, in the above described embodiment the total thickness of attenuator panel is approximately seven-eights inch. It may in some instances be desirable to employ a radar attenuator material in a thickness of, for example, five-eights inch in order to modify the geometry of the vehicle for aerodynamic considerations. In a radar attenuator material employing reactive sheets a change in thickness from seven-eights inch to five-eights inch is readily accomplished by changing the thickness of honeycomb core and possibly deletion of a few sheets of prepreg material. A core thickness of about 0.125 inch is suitable for a five-eights inch thick panel of radar attenuator. Such a change has a minimal effect on the radar reflectance of the panels and the radar reflectance is substantially the same for panels five-eighths inch thick and seven-eighths inch thick throughout the frequency range from L- through X-Bands with the thicker panel somewhat lower in reflectivity at lower frequencies. Similarly radar may impinge on the panel at other than normal incidence, such as, for example, on curved panels. Radar attenuator panels incorporating reactive attenuator sheets can be provided with substantially the same radar reflectance at angles 20° off-normal as at normal incidence.

As pointed out herein in a preferred embodiment a plurality of reactive sheets spaced apart from a metal reflective layer may advantageously be employed in an interference type attenuator of radar. Honeycomb material and glass fabric prepregs serve as spacing layers and to afford structural strength to the material. It should be apparent to one skilled in the art that highly reactive sheets can also advantageously be employed in graded dielectric types of radar attenuators such as that described and illustrated in copending U.S. patent application Ser. No. 542,915 entitled "Radar Attenuator" by Gerald S. Fleming and assigned to North American Aviation, Inc., the assignee of this application. It will be appreciated that reactive sheets such as provided in the practice of this invention may also be employed in other types of radar attenuators.

It is to be understood that the above described examples are merely illustrative of the application of the principles of this invention. Those skilled in the art may readily devise variations and modifications that will embody the principles of the invention. It is therefore to be understood that within the scope of the appended claims the invention may be practiced otherwise than as specifically described.

What is claimed is:

1. In a dielectric prepreg laminating sheet comprising a fabric coated with an uncured resin the improvement comprising both semi-conductive and conductive particles dispersed in said resin for providing both resistance and reactance in said sheet.

2. A dielectric sheet as defined in claim 1 wherein said semi-conductive particles comprise an amorphous finely divided carbon formed from a decomposed hydrocarbon in the range of from 9 to 18 parts by weight per 60 parts by weight of said resin.

3. A dielectric sheet as defined in claim 2 wherein said conductive particles comprise finely divided aluminum in the range of from 5 to 42 parts by weight per 60 parts by weight of said resin.

4. A dielectric sheet as defined in claim 3 wherein the total weight of said resin, carbon, and aluminum is in the range of from 0.01 to 0.10 grams of resin, carbon, and aluminum per square inch of said fabric.

5. A dielectric sheet comprising:
a fabric;
a resin coated on said fabric;
means for providing a ratio of the imaginary portion of admittance of the sheet to the real portion of admittance of the sheet in the range of from about 0.7 to about 2.0; said means comprising:
finely divided particles of semiconductive material dispersed in said resin; and
finely divided particles of conductive material dispersed in said resin.

6. A dielectric sheet as defined in claim 5 wherein said semi-conductive material is present in the range of from 9 to 18 parts by weight per 60 parts by weight of said resin.

7. A dielectric sheet as defined in claim 6 wherein said conductive material is present in the range of from 5 to 42 parts by weight per 60 parts by weight of said resin.

8. A dielectric sheet as defined in claim 7 wherein the total weight of said resin, semi-conductive material and conductive material is in the range of from 0.01 to 0.10 grams of resin, semi-conductive material, and conductive material per square inch of said fabric.

9. A dielectric sheet as defined in claim 7 wherein said conductive material is present in the ratio of from 0.5 to 2.5 parts by weight per part by weight of said semi-conductive material.

10. A dielectric sheet as defined in claim 5 wherein said semi-conductive material comprises an amorphous finely divided carbon formed from a decomposed hydrocarbon and is present in the range of from 9 to 18 parts by weight per 60 parts by weight of said resin.

11. A dielectric sheet as defined in claim 10 wherein said conductive material comprises finely divided aluminum present in the range of from 5 to 42 parts by weight per 60 parts by weight of said resin.

12. A dielectric sheet as defined in claim 11 wherein the total weight of said resin, carbon and aluminum is in the range of from 0.01 to 0.10 grams of resin, carbon and aluminum per square inch of said fabric.

13. A dielectric sheet as defined in claim 11 wherein said aluminum is present in the ratio of from 0.5 to 2.5 parts by weight per part by weight of said carbon.

14. A process for making an artificial dielectric sheet having a ratio of the imaginary portion of the admittance to the real portion of the admittance in the range of from 0.7 to 2.0 comprising:
dispersing finely divided particles of semi-conductive material and finely divided particles of conductive material in a liquid comprising a solvent and a thermo-setting resin in said solvent;
impregnating a fabric with the dispersion;
removing the solvent to leave a coating on the fabric of uncured thermosetting resin with semi-conductive and conductive particles dispersed therein.

15. A process for making an artificial dielectric sheet comprising:
dispersing finely divided particles of carbon in the range of from 9 to 18 parts by weight and finely divided particles of aluminum in the range of from 5 to 42 parts by weight in a liquid comprising a solvent and 60 parts by weight of phenolic resin in said solvent;
impregnating a fabric with the dispersion wherein the weight of resin, carbon and aluminum is in the range of from 0.01 to 0.10 grams per square inch of said fabric; and
removing the solvent to leave coating on the fabric of uncured phenolic resin with carbon and aluminum particles dispersed therein.

16. In a radar attenuating structure comprising a plurality of alternating layers of attenuator sheets and low density dielectric material forming an interference type attenuator, the improvement wherein at least a portion of said attenuator sheets are reactive layers wherein the ratio of the imaginary portion of the admittance relative to the real portion of the admittance is in the range cf from about 0.7 to 2.0.

17. A radar attenuating structure having a plurality of alternating layers of attenuator sheets and low density dielectric material forming an interference type attenuator wherein:
at least a portion of said attenuator sheets comprise a fabric impregnated with a resin having a dispersion of semiconductive particles therein; and
at least a portion of said attenuator sheets further comprise a dispersion of conductive particles dispersed with said semiconductive particles in said resin.

18. A radar attenuating structure as defined in claim 17 wherein each of said low density dielectric material layers comprises a glass fabric-thermosetting resin honeycomb core free of semi-conductive particles.

19. A radar attenuating structure as defined in claim 18 further comprising:
a plurality of glass fabric sheets impregnated with a phenolic resin and arranged to form a layer between one of said honeycomb cores and the surface of the structure upon which radar is expected to impinge; and
a metal reflecting layer adjacent the surface of the structure remote from the surface upon which radar is expected to impinge.

20. A radar attenuator as defined in claim 17 wherein at least a portion of said attenuator sheets form layers having a ratio of the imaginary portion of admittance relative to the real portion of the admittance in the range of from 0.7 to 2.0.

21. A radar attenuating structure as defined in claim 17 wherein said alternating layer of attenuator sheets and dielectric material comprise a bonded assembly of:
a first attenuator sheet comprising a glass fabric impregnated with a phenolic resin having carbon and aluminum powders dispersed therein so that the imaginary portion of the admittance is substantial relative to the real portion of the admittance;
a first dielectric material comprising a glass fabric-phenolic resin honeycomb core free of semi-conductive particles;
a second attenuator sheet comprising a glass fabric impregnated with a phenolic resin having carbon and aluminum powders dispersed therein so that the imaginary portion of the admittance is substantial relative to the real portion of the admittance;
a second dielectric material comprising a glass fabric-phenolic resin honeycomb core free of semi-conductive particles;
a third attenuator sheet comprising a glass fabric impregnated with a phenolic resin having carbon particles dispersed therein;
a third dielectric material comprising a glass fabric-phenolic resin honeycomb core free of semi-conductive particles; and
a metal layer for reflecting radar energy impinging thereon.

22. A radar attenuating structure as defined in claim 21 further comprising:
a fourth dielectric material on the side of the first attenuator sheet remote from said second dielectric material comprising a glass fabric-phenolic resin honeycomb core free of semi-conductive particles; and
a plurality of sheets of glass fabric impregnated with a phenolic resin on the side of said fourth dielectric material remote from said first attenuator.

23. A radar attenuating structure as defined in claim 22 wherein:
said first attenuator sheet has a ratio of imaginary to real portions of admittance of about one in the frequency range from S- through X-Bands; and
said second attenuator sheet has a ratio of imaginary to real portions of admittance of about one in S-Band and about $1\frac{1}{4}$ in X-Band.

24. A radar attenuating structure as defined in claim 17 wherein at least a portion of said attenuator layers have a ratio of the imaginary portion of admittance relative to the real portion of the admittance in the range of from 0.7 to 2.0.

25. A radar attenuating structure as defined in claim 17, wherein said alternating layers of attenuator sheets and low density dielectric material comprise:
a plurality of layers of glass fabric impregnated with a phenolic resin bonded together to form a first layer adjacent the surface of the radar attenuating structure upon which radar is expected to impinge;
a second layer of phenolic resin impregnated glass fabric honeycomb core dielectric material inwardly from said first layer;
a third attenuator layer inwardly from said second layer comprising a glass fabric sheet impregnated with a phenolic resin having amorphous finely divided carbon formed from decomposition of a hydrocarbon and finely divided aluminum dispersed therein, said carbon being present in the proportion of about 9 parts by weight and said aluminum being present in the proportion of about 15 parts by weight per 60 parts by weight of said phenolic resin in an effective thickness for giving a ratio of imaginary to real portions of admittance in the order of 1.0 throughout the frequency range from L- through X-Bands;

a fourth layer of phenolic resin impregnated glass fabric honeycomb core dielectric material inwardly from said third layer;

a fifth attenuator layer inwardly from said fourth layer comprising a glass fabric sheet impregnated with a phenolic resin having amorphous finely divided carbon formed from decomposition of a hydrocarbon and finely divided aluminum dispersed therein, said carbon being present in the porportion of about 9 parts by weight and said aluminum being present in the proportion of about 15 parts by weight per 60 parts by weight of said phenolic resin in an effective thickness for giving a ratio of imaginary to real portions of admittance in the order of about 1.05 in S-Band to about 1.25 in X-Band;

a sixth layer of phenolic resin impregnated glass fabric honeycomb core dielectric material inwardly from said fifth layer;

a seventh attenuator layer inwardly from said sixth layer comprising a glass fabric sheet impregnated with a phenolic resin having amorphous finely divided carbon formed from decomposition of a hydrocarbon dispersed therein; said carbon being present in the proportion of about 15 parts by weight per 60 parts by weight of said phenolic resin;

an eighth layer of phenolic resin impregnated glass fabric honeycomb core dielectric material inwardly from said seventh layer; and a metal reflective layer inwardly of said eighth layer.

* * * * *